July 31, 1951 W. E. KAUTENBERG 2,562,383
FISHING TACKLE
Filed Oct. 28, 1947

*INVENTOR:*
WILLIAM E. KAUTENBERG
BY
ATT'Y.

Patented July 31, 1951

2,562,383

UNITED STATES PATENT OFFICE 2,562,383

FISHING TACKLE

William E. Kautenberg, Freeport, Ill.

Application October 28, 1947, Serial No. 782,664

3 Claims. (Cl. 43—44.83)

This invention relates in general to fishing tackle in which the hook is held normally in a horizontal position in the water and the hook is movable to a vertical or depending position when grabbed or struck by a fish.

An important object of the invention is to provide means for normally supporting a fishing hook in horizontal position and for swinging the hook to a depending or other position when the hook is engaged by a fish.

A further object of the invention is to support a bait or lure in horizontal position within or adjacent to a fishing hook which is also supported in horizontal position, and to mount the lure and the hook so that they may swing to other positions when the hook is engaged by a fish and the bait or lure is deflected from its horizontal position.

A further object of the invention is to provide a simple, reliable and efficient holder for a fishhook by means of which it is supported either with or without bait thereon in a horizontal position which is the natural position for engagement by a fish swimming in the water and to allow the hook to swing relative to the holder when the hook is firmly engaged by a fish.

Other objects of the invention will appear in the specification and will be apparent from the accompanying drawings in which.

Figure 3:
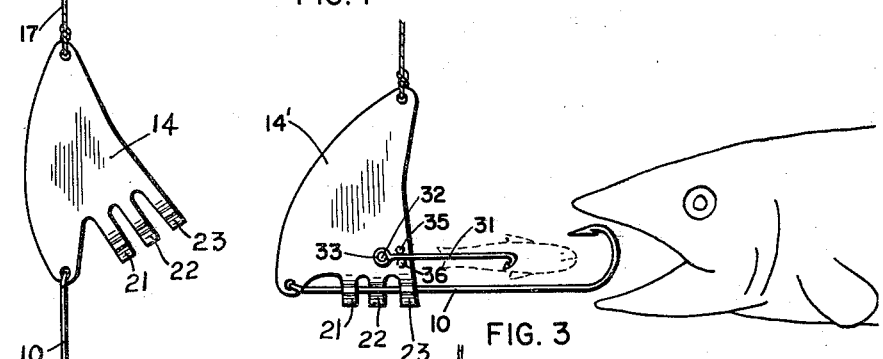
Figure 4:
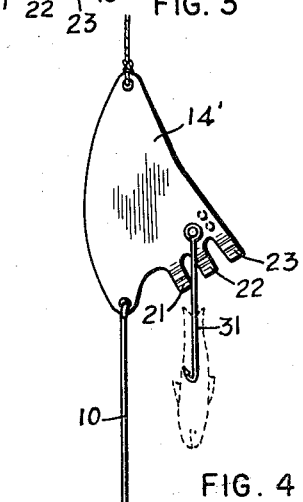

Fig. 3 is an elevational view of fishing tackle in accordance with this invention in which a bait holding hook is supported in horizontal position within the main fishhook which is also in horizontal position; and Fig. 4 is an elevational view of the structure shown in Fig. 3 when the main fishing hook has been disengaged from its horizontal support and the bait hook has been dislodged from its horizontal support.

Although a fish is able to swim at any inclination or angle in the water, it is most naturally in a horizontal position and it frequently approaches bait and fishing tackle in this position.

The present invention provides a simple, easily mounted and readily adjustable tackle arrangement for supporting a hook, or a lure in conjunction with a hook in a horizontal position, and for allowing the hook, or both the hook and the lure to swing to some other position so that a fish engaged by the hook is not easily disengaged from the hook.

Referring now more particularly to the drawings, an ordinary fishhook 10 having a barb 11 at one end and an eye 12 at the other end of the shank is supported by a thin stiff plate 14 of metal or any other suitable material. This plate is somewhat triangular in its general outline with an opening 15 at one corner to receive the eye 12 of the hook, an opening 16 at another corner to which a supporting fish line 17 is attached, and a plurality of spring fingers 21, 22 and 23 extending from the edge opposite the opening 16.

Figure 1:
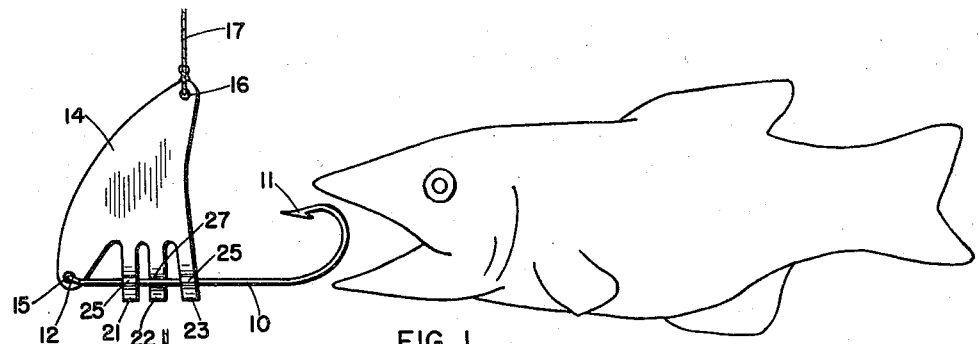
Fig. 1 is an elevational view of fishing tackle in accordance with this invention with the hook supported in horizontal position.

The fingers 21 and 23 have curved grooves or offsets 25 in one direction and the finger 22 has a curved groove or offset 27 in the other direction adjacent their extremities so that the shank of the hook 10 may be inserted between these fingers for holding the barbed end of the hook in an upright position with respect to the plate 14 as shown in Fig. 1. This hook is shown without bait or lures of any kind, but they may be applied thereto in any well known manner as desired.

Figure 2:
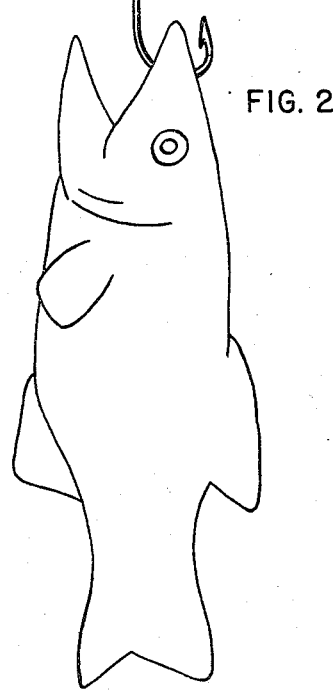
Fig. 2 is an elevational view of the structure shown in Fig. 1 when the hook is engaged by a fish.

When this fishing tackle is lowered into the water, the hook, and any bait or lure thereon is supported in a horizontal position, the natural position which would be assumed by a fish swimming in the water toward the bait. When the hook is engaged sufficiently or by a fish of sufficient size, the hook will be pulled from its engagement with the spring fingers so that the openings 16 and 15 of the tackle plate are in alignment with the shank of the hook as represented in Fig. 2. In this position, the operations of playing and landing the fish are not affected by the plate, but it is pretty sure that the fish is securely hooked if the hook has been disengaged from the plate by the fish.

In addition to the structure shown in Fig. 1, a plate 14' as shown in Figs. 3 and 4 may also be provided with a separate bait hook 31 for attaching minnows or other bait adjacent to and within the hook 10 but not actually engaged therewith. In this arrangement, the hook 31 is mounted to swing a rivet 32 which passes through an eye 33 at the end of the shank of the hook 31. To hold this hook in substantially horizontal position within the main hook 10, a pair of scores or projections 35 and 36 are formed in the material of the plate 14 between the rivet 32 and the adjacent edge of the plate spaced apart sufficiently so that the shank of hook 31 may be seated therebetween. There is sufficient play or give in the rivet and the hook so that the hook 31 may be rotated as shown in Fig. 4 to a position beyond the lower projection 36, and likewise beyond the upper projection 35.

The arrangement as shown in Figs. 3 and 4 has the advantage that the bait hook 31 is within the larger hook 10 and the larger hook is engaged frequently without disengaging the bait from the bait hook. Sometimes the bait hook is not deflected even though the large hook 10 is disengaged from its spring fingers.

To reset the main hook, the spring fingers 21, 23 and 22 are sprung oppositely inserting the shank of the hook 10 therebetween. To reset the hook 31, it is simply pressed over either one of the projections 35 or 36 to a position between them.

While a simple embodiment of this invention has been described in some detail, it should be regarded by way of example or illustration and not as a restriction or limitation of the invention as various changes in the construction, combination, and arrangement of the parts may be made without departing from the spirit and scope of the invention.

I claim:

1. A fishing tackle, comprising a triangular plate-like support having perforations at opposite angles, a plurality of spring fingers integral therewith and below one of the angles when it is suspended in vertical position, and a fishhook having its shank pivoted in the lower perforation and adapted to engage between the spring fingers for holding the hook in horizontal position when it is suspended by the upper perforation, the two perforations and the shank of the hook being substantially in line when the hook is disengaged from the spring fingers and the hook is engaged by a fish.

2. A fishing tackle, comprising a plate-like support adapted to be suspended by a fishline, a fishhook having an eye at the end of its shank pivotally engaged by the lower end of the support, a plurality of spring fingers along the lower edge of the support for engaging the shank and holding the hook substantially in horizontal position when suspended by a fishline, and a supplemental bait hook pivotally connected to the plate-like support above the spring fingers and extending horizontally within the first mentioned fishhook.

3. A fishing tackle, comprising a plate-like support adapted to be suspended in vertical position by a fishline connected at the upper end thereof, a fishhook having a shank with an eye at the end pivoted at the lower edge of the support, means at the lower edge of the support for engaging the shank of the fishhook and supporting it in horizontal position when the plate is suspended by a fishline, a bait hook pivoted to the support adjacent the lower edge and extending substantially parallel to and above the first mentioned fishhook, and projections from the plate between the pivotal mounting of the bait hook and the adjacent edge of the support and between which the shank of the bait hook engages for holding it parallel and substantially horizontal with the first mentioned hook.

WILLIAM E. KAUTENBERG.

REFERENCES CITED

The following references are of record in the file of this patent:

UNITED STATES PATENTS

| Number | Name | Date |
| --- | --- | --- |
| 586,992 | Mills | July 27, 1897 |
| 984,963 | Paysen | Feb. 21, 1911 |
| 1,081,106 | Foerster | Dec. 9, 1913 |
| 1,365,813 | Brown | Jan. 18, 1921 |
| 2,239,802 | Westby | Apr. 29, 1941 |
| 2,274,131 | Edberg | Feb. 24, 1942 |

FOREIGN PATENTS

| Number | Country | Date |
| --- | --- | --- |
| 76,556 | Sweden | May 29, 1931 |